US006490275B1

(12) United States Patent
Sengodan (10) Patent No.: US 6,490,275 B1
(45) Date of Patent: Dec. 3, 2002

(54) METHOD AND APPARATUS FOR IMPROVING CALL SETUP EFFICIENCY IN MULTIMEDIA COMMUNICATIONS SYSTEMS

(75) Inventor: Senthil Sengodan, Woburn, MA (US)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/170,378

(22) Filed: Oct. 13, 1998

(51) Int. Cl.[7] .......................... H04L 12/66; H04L 12/28; H04M 7/00
(52) U.S. Cl. ...................... 370/356; 370/356; 370/401; 379/220.01
(58) Field of Search ................................. 370/260, 356, 370/352, 261–266, 270, 410, 354, 355, 401, 400, 351, 353, 465–467, 468; 379/202, 88.15, 219, 220, 221.07, 88.17; 348/15–16

(56) References Cited

U.S. PATENT DOCUMENTS

| 4,924,493 A | | 5/1990 | Dang et al. | |
|---|---|---|---|---|
| 6,018,360 A | * | 1/2000 | Stewart et al. | 379/202 |
| 6,061,650 A | * | 5/2000 | Malkin et al. | 370/401 |
| 6,069,890 A | * | 5/2000 | White et al. | 370/352 |
| 6,157,401 A | * | 12/2000 | Wiryaman | 370/260 |
| 6,163,531 A | * | 12/2000 | Kumar | 370/260 |
| 6,185,288 B1 | * | 2/2001 | Wong | 379/219 |
| 6,201,805 B1 | * | 3/2001 | Strathmeyer | 370/356 |
| 6,259,691 B1 | * | 7/2001 | Naudus | 370/352 |

FOREIGN PATENT DOCUMENTS

| EP | 0 781 015 A2 | 6/1997 |
|---|---|---|
| WO | WO 97/01909 | 1/1997 |

OTHER PUBLICATIONS

*ITU–T Recommendation H. 323. Visual telephone systems and equipment for local area networks which provide a non–guaranteed quality of service,* ITU–T Recommendation H. 323, 30–30 Nov. 1996, pp. 34–46.

"Control protocol for multimedia communication", *International Telecommunication Union*, ITU–T, H.245, 188 pages (Mar. 1996).

"Visual telephone systems and equipment for local area networks which provide a non–guaranteed quality of service", *International Telecommunication Union*, ITU–T, H.323, 79 pages (Nov. 1996).

"Media stream packetization and synchronization on non–guaranteed quality of service LANs", *International Telecommunication union*, ITU–T, H.225.0, 113 pages (Nov. 1996).

* cited by examiner

Primary Examiner—Kwang Bin Yao
Assistant Examiner—Hanh Nguyen
(74) Attorney, Agent, or Firm—Altera Law Group, LLC (57) ABSTRACT

A method and apparatus for improving call setup efficiency in multimedia communication systems is disclosed. The present invention performs call setup in H.323 systems using fewer message exchanges, thereby resulting in a more efficient call setup mechanism. Moreover, no call setup functionality is sacrificed by resorting to fewer message exchanges. The method includes placing a call at a first endpoint to a remote endpoint, requesting admission from a gatekeeper for the call, returning an accept message to the first endpoint, the accept message including a token for providing information to the remote endpoint alleviating the need of the remote endpoint to request admission from a gatekeeper, routing a setup message to the remote endpoint, the setup message including the token and completing a call setup based upon information in the token.

32 Claims, 8 Drawing Sheets

| Scenario | H.323v2 | Proposed |
|---|---|---|
| Neither endpoint registered | 4 | 4 |
| Both endpoints registered to same gatekeeper, direct call signaling | 8 | 6 |
| Both endpoints registered to same gatekeeper, gatekeeper routed call signaling | 8 | 6 |
| Only calling endpoint registered, direct call signaling | 6 | 6 |
| Only calling endpoint registered, gatekeeper routed call signaling | 6 | 6 |
| Only called endpoint registered, direct call signaling | 6 | 6 |
| Only called endpoint registered, gatekeeper routed call signaling | 12 | 7 |
| Both endpoints registered, both gatekeepers direct call signaling | 8 | 6 |
| Both endpoints registered, direct/routed call signaling | 18 | 6 |
| Both endpoints registered, routed/direct call signaling | 8 | 6 |

METHOD AND APPARATUS FOR IMPROVING CALL SETUP EFFICIENCY IN MULTIMEDIA COMMUNICATIONS SYSTEMS

BACKGROUND OF THE INVENTION

1. Field of the Invention

This invention relates in general to a multimedia communications, and more particularly to a method and apparatus for improving call setup efficiency in multimedia communication systems.

2. Description of Related Art

Of the communication tools found in most offices today, such as E-mail, fax machines, pagers, and cellular phones, videoconferencing has yet to make the short list. However, this is changing, as companies move to take advantage of lower system costs and emerging new standards. For example, videoconferencing over an enterprise IP network is very appealing. It makes better use of an organization's finds rather than sinking additional investments in ISDN lines. Up to now, ISDN has been the only reliable way to connect video-enabled workstations and conference-room-based systems. However, the technology isn't readily available, and it's still expensive. Nevertheless, H.323-standard LAN-operable DVC (desktop videoconferencing) solutions are available.

The H.323 standards architecture specifies gateways and gatekeepers that enable connections among LAN-based DVC units, ISDN-connected H.320 units, analog telephone-connected H.324 devices, and ISDN and POTS telephones. One rapidly emerging branch of this market includes gateway and billing server systems devoted to Internet telephony.

The H.323 standard provides a foundation for audio, video, and data communications across IP-based networks, including the Internet. By complying to H.323, multimedia products and applications from multiple vendors can interoperate, thereby allowing users to communicate without concern for compatibility. H.323 will be the keystone for LAN-based products for consumer, business, entertainment, and professional applications.

More specifically, H.323 is an umbrella recommendation from the International Telecommunications Union (ITU) that sets standards for multimedia communications over Local Area Networks (LANs) that do not provide a guaranteed Quality of Service (QoS). These networks dominate today's corporate desktops and include packet-switched TCP/IP and IPX over Ethernet, Fast Ethernet and Token Ring network technologies. Therefore, the H.323 standards are important building blocks for a broad new range of collaborative, LAN-based applications for multimedia communications.

The H.323 specification was approved in 1996 by the ITU's Study Group 16. Version 2 was approved in January 1998. The standard is broad in scope and includes both stand-alone devices and embedded personal computer technology as well as point-to-point and multipoint conferences. H.323 also addresses call control, multimedia management, and bandwidth management as well as interfaces between LANs and other networks.

H.323 is the latest of the recommendations on the H.32X series which specifies standards for videoconferencing over a variety of networks. H.323 includes much of the work done since the approval of the H.320 recommendation in 1990, which is an specification for multimedia over circuit switched digital telephone networks. The H.32X is composed of the following recommendations:

H.320 allows videoconferencing over narrowband switched ISDN.

H.321 is for videoconferencing over broadband ISDN ATM LAN.

H.322 allows videoconferencing over Guaranteed bandwidth packet switched networks.

H.323 allows videoconferencing over non-guaranteed bandwidth packet switched networks.

H.324 is for videoconferencing over PSTN or POTS (the analog phone system).

The H.323 Protocol Stack supports many real time applications that the industry is eager to use through the Internet such as: Desktop Videoconferencing, Internet Telephony and Videotelephony, Collaborative Computing, Business Conference Calling, Distance Learning, Support and Help Desk Applications, etc. These applications already exist in the market, but most of them do not address the problem of how to run these applications over a packet switch network like the Internet and most corporate LANs which are based in the TCP/IP suite of protocols. With the pressure of the market to use this kind of applications over the Internet, H.323 emerges as a possible solution to the business needs.

Figure 1:
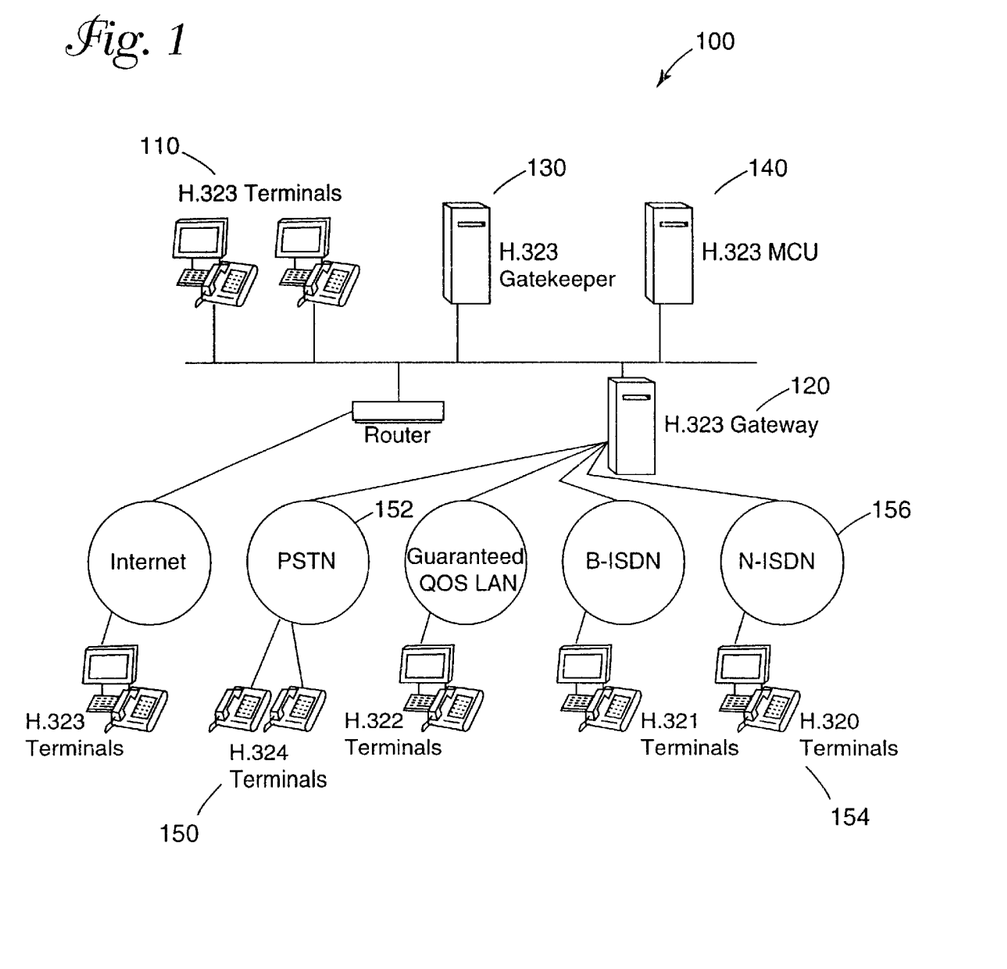
FIG. 1 illustrates a H.323 system.

H.323 defines four major components for a network-based communications system. FIG. 1 illustrates a H.323 system 100. In FIG. 1, the four major components of a H.323 system 100 are shown including their interaction with existing networks. These components interact with LANs that don't provide QoS. The four components include Terminals 110, Gateways 120, Gatekeepers 130 and Multipoint Control Units (MCUs) 140.

These four elements 110–140 are specified only for the Application Layer of the Internet Layer Model. There is no specification about the lower layers (Transport, Network, Data link and physical layers). These characteristic makes H.323 flexible and allows H.323 devices to communicate with device of other networks.

H.323 Terminals 110 are the client software that runs in the end user computers that allow users to communicate in real time using all the power of multimedia. These terminals are also called Endpoints.

A Gateway 120 is a component of the H.323 specification that provides world wide connectivity and interoperability from LAN. That is, a Gateway 120 will allow computers connected to a LAN to communicate to regular phones 150 connected to the PSTN 152, to digital phones 154 (H.320 terminals) connected to an ISDN network 156. A gateway 120 also translates between different types of codecs used by different kinds of terminals, maps call signaling between Q.931 to H.225 and maps control signaling between H.242/H.243 to H.245.

In general, a Gateway 120 is a component that makes possible to interconnect a packet switched network with no QoS to other types of networks. If connections to different types of networks are not required, then a Gateway 120 is not required since terminals can communicate between them if they are on the same LAN. Terminals communicate with gateways using Q.931 and H.245 protocols.

A Gatekeeper 130 is an H.323 component that performs four basic functions:

Address Translation: It is the mechanism that allows to have different kinds addressing systems. For example, regular phone numbers (E.164 addresses) can be used in conjunction with e-mail addresses. The Gatekeeper 130 allows to communicate with terminals addressed in different ways.

Admission Control: The Gatekeeper 130 could reject calls from users. An user must be registered with the Gatekeeper 130 in order to complete a call.

Bandwidth Control: Networks managers can restrict the amount of bandwidth used for videoconference, which provide a way to control LAN traffic. The remaining of the bandwidth can be used then for web requests, e-mail, file transfers, etc.

Zone Management: The Gatekeepers 130 provide the functions of Address Translation, Admission Control and Bandwidth control for Terminals 110, MCUs 140 and Gateways 120 registered with the Gatekeeper 130 in its zone of control. This zone is called H.323 zone.

The functions of the Gatekeeper 130 are included in the Gateway 120 by most vendors, although they are logically separated and they perform different kind of functions.

The Multipoint Control Unit (MCU) 140 is a logical device that supports conferences between three or more endpoints. The MCU 140 typically is integrated with the implementation of the gateway, so in most implementations the MCU 140 won't be a separate computer performing conferencing functions. Also, with a combined implementation of the functions of the MCU 140 with the functions of the gateway 120, conferences among participants of different networks (LAN and PSTN) will have better performance than divided implementations.

Call setup in H.323 systems requires the exchange of several messages between several entity pairs. The sequence of message exchanges is specified by H.323 and depends upon the presence or absence of gatekeepers for the calling and/or called endpoint and on the choice of direct/gatekeeper routed models. Nevertheless, the call setup time could be reduced and efficiency improved if the number of message exchanges could be reduced without sacrificing any of the call setup functionality.

If can also be seen that there is a need for a method and apparatus for improving call setup efficiency in H.323 systems.

SUMMARY OF THE INVENTION

To overcome the limitations in the prior art described above, and to overcome other limitations that will become apparent upon reading and understanding the present specification, the present invention discloses a method and apparatus for improving call setup efficiency in multimedia communication systems.

The present invention solves the above-described problems by performing call setup in H.323 systems using fewer message exchanges, thereby resulting in a more efficient call setup mechanism. Moreover, no call setup functionality is sacrificed by resorting to fewer message exchanges.

A method in accordance with the principles of the present invention includes placing a call at a first endpoint to a remote endpoint, requesting admission from a gatekeeper for the call, returning an accept message to the first endpoint, the accept message including a token for providing information to the remote endpoint alleviating the need of the remote endpoint to request admission from a gatekeeper, routing a setup message to the remote endpoint, the setup message including the token and completing a call setup based upon information in the token.

Other embodiments of a system in accordance with the principles of the invention may include alternative or optional additional aspects. One such aspect of the present invention is that the first endpoint and the remote endpoint are registered with a common gatekeeper.

Another aspect of the present invention is that direct call signaling is implemented by the first endpoint and the remote endpoint, the routing of the setup message being performed by transmitting directly to the remote endpoint the setup message including the token.

Another aspect of the present invention is that gatekeeper routed call signaling is implemented, the routing of the setup message is performed by routing the setup message including the token from the first endpoint to the common gatekeeper and routing the setup message including the token from the common gatekeeper to the remote endpoint.

Another aspect of the present invention is that the first endpoint is registered with a first gatekeeper and the remote endpoint is registered with a second gatekeeper.

Another aspect of the present invention is that the requesting admission from a gatekeeper for the call further includes requesting admission by the first endpoint from the first gatekeeper, analyzing by the first gatekeeper the admission request to determine if a criterion for the call is acceptable according to requirements local to the first gatekeeper, routing the admission request to the second gatekeeper when the first gatekeeper determines the criterion for the call is acceptable, analyzing by the second gatekeeper the admission request to determine if a criterion for the call is acceptable according to requirements local to the second gatekeeper and sending an admission confirmation including the token to the first gatekeeper when a required criterion for the call is determined to be acceptable according to the requirements local to the second gatekeeper.

Another aspect of the present invention is that the first and second gatekeepers implement direct call signaling, the routing of the setup message being performed by transmitting directly to the remote endpoint the setup message including the token.

Another aspect of the present invention is that the first gatekeeper implements direct call signaling and the second gatekeeper implements routed call signaling, the routing of the setup message is performed by transmitting the setup message including the token to the second gatekeeper and the second gatekeeper transmitting the setup message including the token to the remote endpoint.

Another aspect of the present invention is that the completing the call setup further comprises routing of the setup message by transmitting connect/facility messages from the remote endpoint to the second gatekeeper and transmitting the connect/facility messages to the first endpoint setup message from the second gatekeeper.

Another aspect of the present invention is that the first gatekeeper implements routed call signaling and the second gatekeeper implements direct call signaling, the routing of the setup message is performed by transmitting the setup message including the token to the first gatekeeper and the first gatekeeper transmitting the setup message including the token to the remote endpoint.

Another aspect of the present invention is that the completing the call setup further comprises routing of the setup message by transmitting connect/facility messages from the remote endpoint to the first gatekeeper and transmitting the connect/facility messages to the first endpoint setup message from the first gatekeeper.

Another aspect of the present invention is that the first gatekeeper and the second gatekeeper implement routed call signaling, the routing of the setup message is performed by transmitting the setup message including the token to the first gatekeeper, the first gatekeeper transmitting the setup message including the token to the second gatekeeper and the second gatekeeper transmitting the setup message including the token to the remote endpoint.

Another aspect of the present invention is that the completing the call setup further comprises routing of the setup message by transmitting connect/facility messages from the remote endpoint to the second gatekeeper, transmitting the connect/facility messages to the first gatekeeper from the second gatekeeper, and transmitting the connect/facility messages to the first endpoint setup message from the first gatekeeper.

Another aspect of the present invention is that the routing the admission request to the second gatekeeper further comprises routing the admission request through a cloud of gatekeepers.

Another aspect of the present invention is that the token comprises a transport address of the second gatekeeper.

Another aspect of the present invention is that the token comprises resource allocations for the call.

An alternative embodiment of the present invention includes sending a setup message from a first endpoint to a remote endpoint, requesting admission from a gatekeeper for the call, the request for admission including all information required for performing call setup, returning an accept message to the remote endpoint, the accept message indicating to the remote endpoint that the gatekeeper is implementing routed call signaling and including a transport address for the gatekeeper, and routing a facility message to the first endpoint informing the first endpoint of the transport address for the gatekeeper and that the call signaling channel is through the gatekeeper.

Another aspect of the present invention is that the first endpoint is not registered and the remote endpoint is registered with the gatekeeper.

Another embodiment of the present invention is a multimedia communications system, the multimedia communications system including a first endpoint for placing a call to a remote endpoint, and a gatekeeper, operatively coupled to the first endpoint, the gatekeeper performing address translation, admission control and bandwidth control, wherein the first endpoint requests admission from the gatekeeper for the call, the gatekeeper returns an accept message to the first endpoint, the accept message including a token for providing information to the remote endpoint alleviating the need of the remote endpoint to request admission from a gatekeeper, the first endpoint routes a setup message to the remote endpoint, the setup message including the token and the remote endpoint completes the call setup based upon information in the token.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for performing call setup in multimedia communication systems using fewer message exchanges, thereby resulting in a more efficient call setup mechanism. Moreover, no call setup functionality is sacrificed by resorting to fewer message exchanges.

Figure 2:
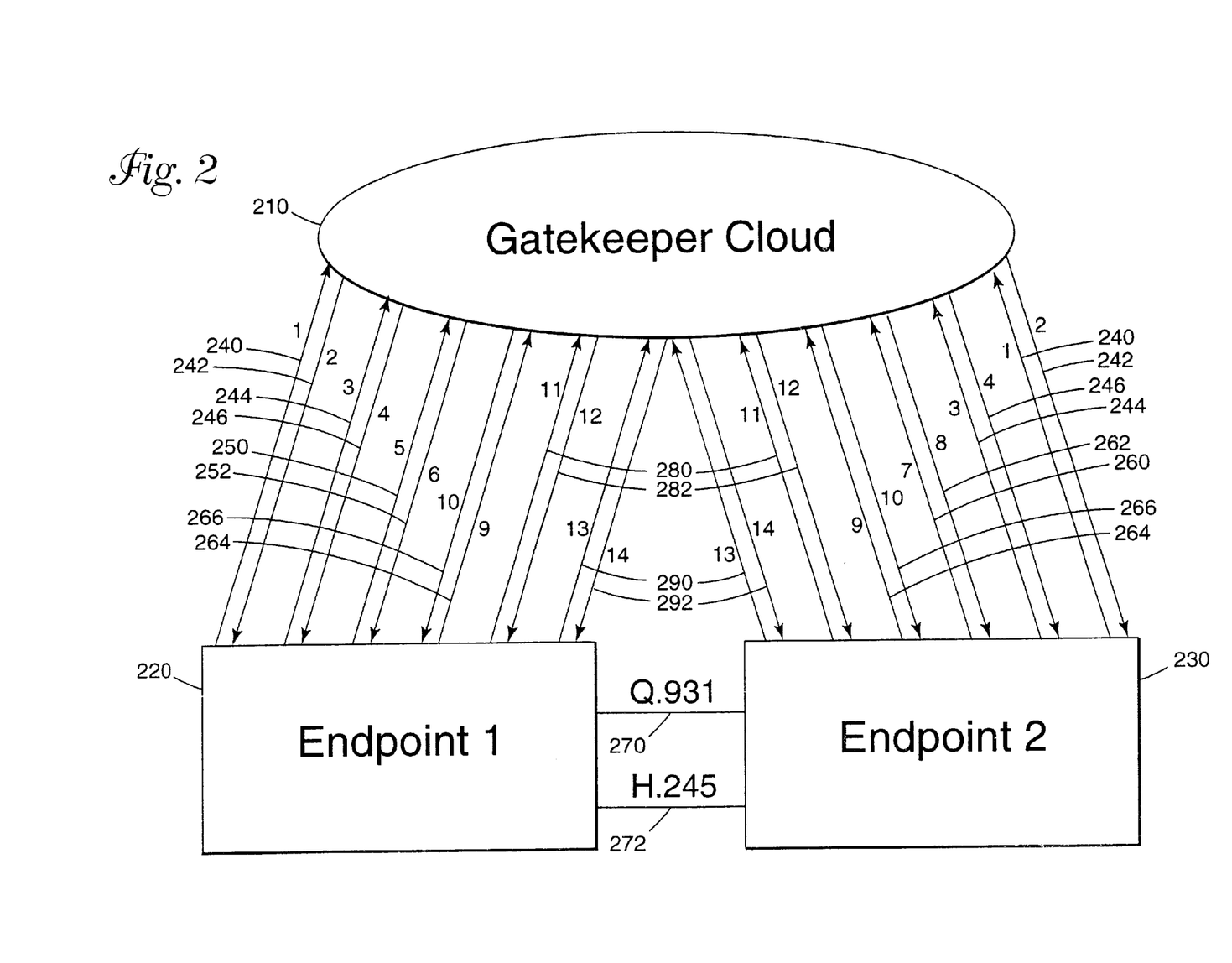
FIG. 2 illustrates the messages exchanged between a gatekeeper cloud and H.323 endpoints.

FIG. 2 illustrates the messages 200 exchanged between a gatekeeper cloud 210 and H.323 endpoints 220, 230. While each endpoint may be using a distinct gatekeeper, for purposes of simplifying and clarifying the signaling between endpoints and a gatekeeper, a general gatekeeper cloud 210 is shown in FIG. 2. Before the conference starts, both endpoints 220, 230 look for a gatekeeper 210 by multicasting a GatekeeperDiscovery Request (GRQ) 240. The gatekeeper will reply 242 either with a GatekeeperConfirm (GCF) message or with a GatekeeperReject (GRJ) message. Then both endpoints 220, 230 will register their alias names with the gatekeeper using the RegistrationRequest (RRQ) message 244. The gatekeeper 210 acknowledges 246 by sending a RegistrationConfirm (RCF) message or denies the registration using a Registration Reject (RRJ) message. Registering alias names with the gatekeeper 210 allows endpoints 220, 230 to call each other using user-friendly addresses, e.g., e-mail, rather than the transport address. The discovery and registration procedure is valid until the gatekeeper 210 indicates otherwise. An endpoint 220, 230 or gatekeeper 210 can request the location of another endpoint using its alias name by using a LocationRequest (LRQ) message 250, and the gatekeeper 210 replies 252 with a LocationConfirm (LCF) message containing the resolved address for the alias name.

When a user places a call from an endpoint 220, the endpoint 220 starts by requesting admission from the gatekeeper using an AdmissionRequest (ARQ) message 260. The gatekeeper 210 can respond 262 by accepting (ACF) or denying the request (ARJ). If the call is accepted, the endpoint 220 sends a Q.931 Setup message 270 to the remote destination 230. The recipient 230 of the Setup message 270 in turn requests admission from its gatekeeper 210 by sending an ARQ 260. When the call is accepted 262, the Q.931 call signaling sequence 270 is completed followed by the H.245 message negotiation 272.

The Admission Request (ARQ) message 250, 260 carries the initial bandwidth the endpoint requires for the duration of the conference. If during H.245 logical channel negotiation 272, an endpoint 230 requires more bandwidth, it issues a BandwidthRequest (BRQ) message 264 to the gatekeeper 210. If the request is accepted, the gatekeeper 210 replies 266 with a BandwidthConfirm (BCF) message; otherwise, it replies with a BandwidthReject (BRJ) message.

When the call is terminated, both endpoints 220, 230 send a DisengageRequest (DRQ) message 280 to inform the gatekeeper 210 that a call is being terminated. The gatekeeper 210 replies 282 with a confirm (DCF) or reject (DRJ) message. Alternatively, endpoints 220, 230 may unregister from the gatekeeper 210 by sending an UnregisterRequest (URQ) message 290. The gatekeeper replies 292 with an UnregisterConfirm (UCF) message or an UnregisterReject (URJ) message.

As can be seen from FIG. 2, several messages need to be exchanged between entity pairs prior to completion of the call set-up phase in H.323 systems. The present invention allows the number of message exchanges to be decreased.

Figure 3:
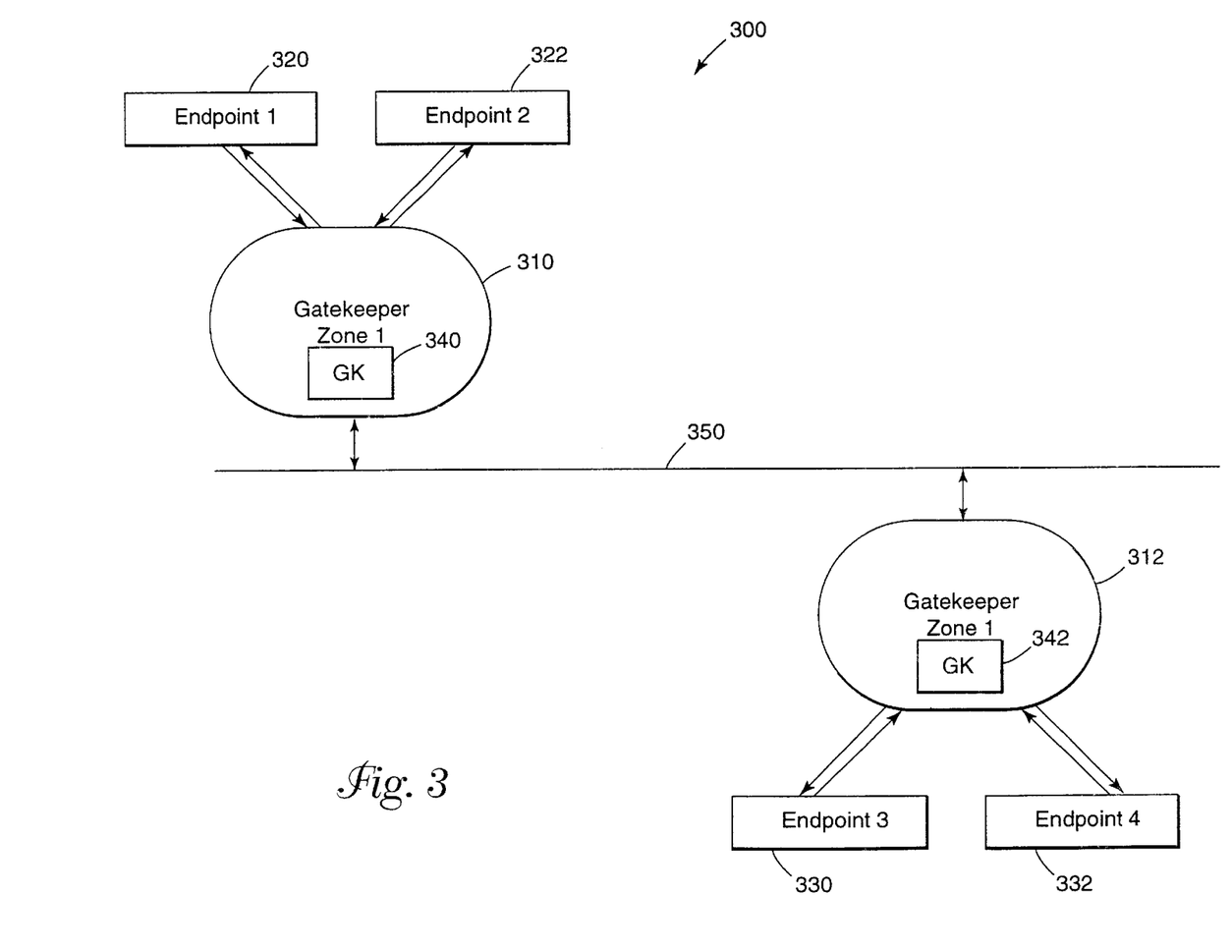
FIG. 3 illustrates an H.323 system wherein a pair of endpoints are associated with different gatekeepers representing distinct gatekeeper zones.

FIG. 3 illustrates an H.323 system wherein a pair of endpoints 320/322, 330/332 are associated with different gatekeepers 340, 342 representing distinct gatekeeper zones 310, 312. Gatekeepers 340, 342 fulfill a required set of operational responsibilities and may offer a number of optional functions to entities within their zone 310, 312. A gatekeeper 340, 342 acts as a monitor of all H.323 calls within its zone on the network. It has two main responsibilities: call approval and address resolution.

An H.323 client 320/322, 330/332 that wants to place a call cannot do so without the assistance of the gatekeeper 340, 342. The gatekeeper 340, 342 provides the address resolution to the destination client 320/322, 330/332. This division of work is due to alias name registration procedures. During this address resolution phase, the gatekeeper 340, 342 may also make permissioning decisions based upon available bandwidth. The gatekeeper 340, 342 can act as an administrative point on the network for IT/IS managers to control H.323 traffic on and off the network.

Strictly speaking, a gatekeeper zone 310, 312 is defined by what it contains: it is defined by all of the endpoints 320/322, 330/332, gateways 340, 342, and MCUs (not shown) that are or will be registered with a gatekeeper 340, 342. Zones 310, 312 are defined by all H.323 devices registered to a single gatekeeper. A zone design may be independent of physical topology and each zone 310, 312 has only one gatekeeper 340, 342 respectively. Zone definition is implementation-specific and gatekeeper zones 310, 312 are logical in nature.

Figure 4:
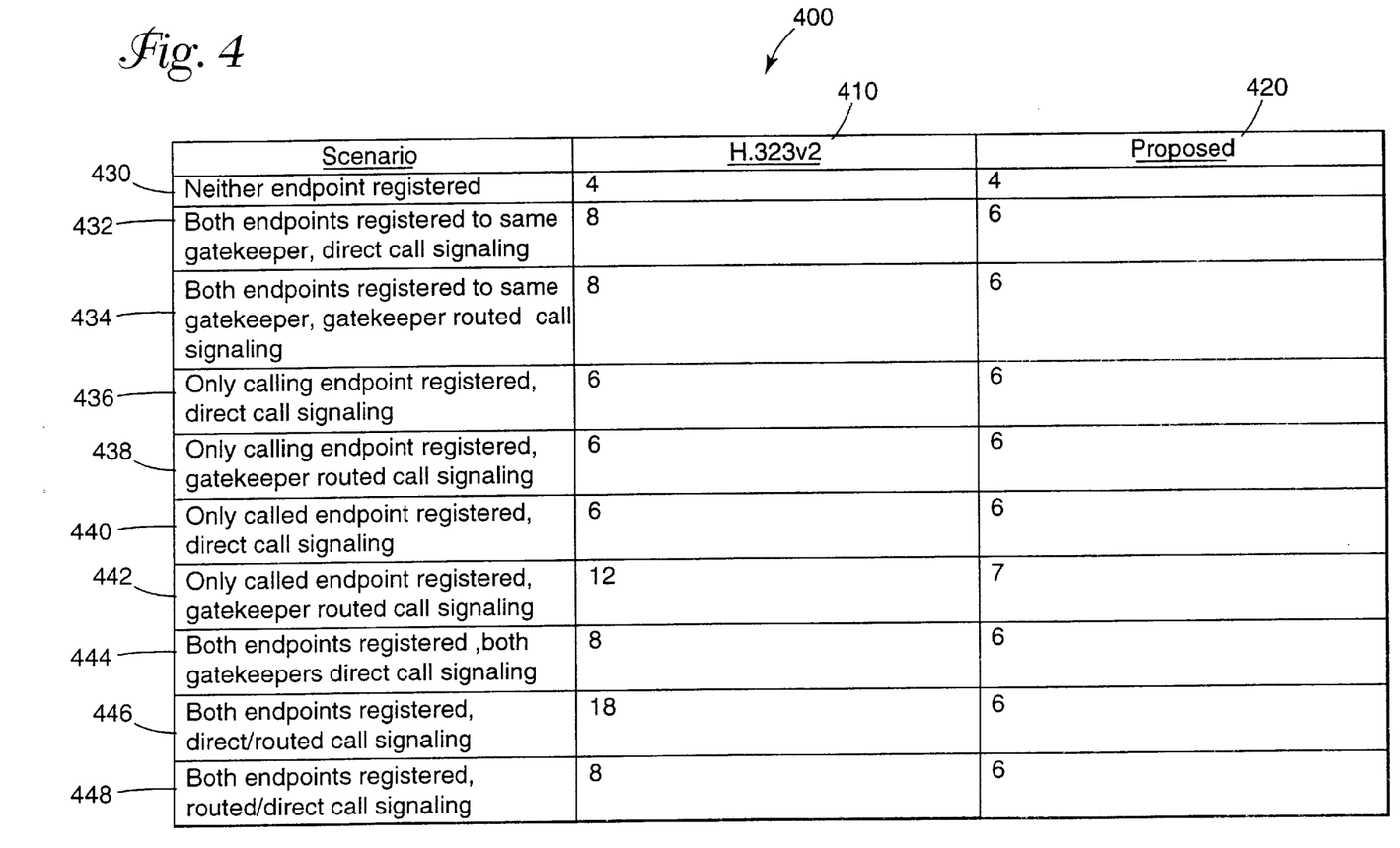
FIG. 4 is a table comparing the number of messages exchanged in the H.323v2 specification and in the call setup method for H.323 systems according to the present invention.

FIG. 4 is a table 400 comparing the number of messages exchanged in the H.323v2 specification 410 and in the call setup method for H.323 systems according to the present invention 420. FIG. 4 illustrates the comparison for 10 scenarios as follows:

1. Neither endpoint registered 430,
2. Both endpoints registered to the same gatekeeper, direct call signaling 432,
3. Both endpoints registered to the same gatekeeper, gatekeeper routed call signaling 434,
4. Only calling endpoint registered, direct call signaling 436,
5. Only called endpoint registered, direct call signaling 438,
6. Only called endpoint registered, gatekeeper routed call signaling 440,
7. Only called endpoints registered, gatekeeper routed call signaling 442,
8. Both endpoints registered, both gatekeepers direct call signaling 444,
9. Both endpoints registered, direct/routed call signaling 446, and
10. Both endpoints registered, routed/direct routed call signaling 448.

To decrease the number of messages when an ARQ/ACF exchange is performed between the calling endpoint and its gatekeeper, the gatekeeper of the called endpoint could allocate resources for the call at this stage since the gatekeeper of the called endpoint usually has to be contacted. This obviates the need for the called endpoint to engage in an ARQ/ACF exchange with its gatekeeper at a later stage.

Further, when the calling endpoint engages in an ARQ/ACF exchange with its gatekeeper and when called endpoint gatekeeper routed call signaling is desired, the transport address of the called gatekeeper (instead of the called endpoint) is returned in the ACF message. When the calling endpoint is not registered with a gatekeeper and when called endpoint gatekeeper routed call signaling is desired, disconnection and re-setup of call is eliminated. Instead, indication of gatekeeper routed call signaling is made by the call endpoint directly to the calling endpoint after which the functionality of called endpoint gatekeeper routed call signaling is employed.

FIGS. 5–11 demonstrate the call setup messaging according to the present invention. When neither endpoint is registered, the message exchange is identical to the message exchange described in the H.323 specification.

Figure 5:
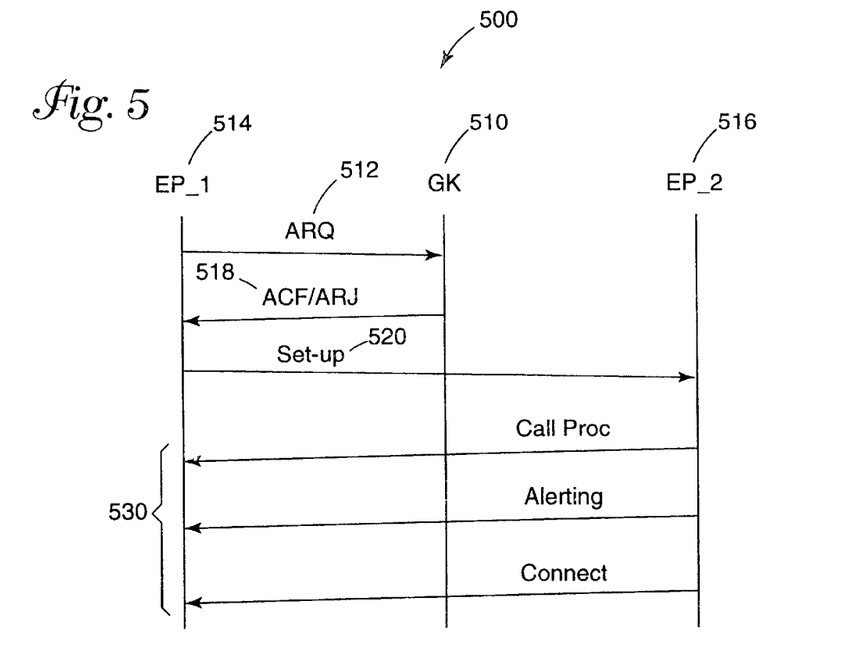
FIG. 5 illustrates the call setup messaging when both endpoints are registered to the same gatekeeper and direct call signaling is used.

FIG. 5 illustrates the call setup messaging when both endpoints are registered to the same gatekeeper and direct call signaling is used 500. In FIG. 5, when GK 510 gets an ARQ 512 from EP_1 514 indicating its desire to communicate with EP_2 516, a decision of ACF/ARJ 518 is made with both EP_1 514 and EP_2 516 in mind. An ARJ is sent if some required criterion, such as bandwidth requirements or authorization, is not satisfied. If the requirements are satisfied, GK 510 sends an ACF to EP_1 514 along with a token (or cryptotoken). This token is then passed by EP_1 514 to EP_2 516 in the Set-up message 520. The information carried in the token includes:

Assurance that the token was generated by EP_2's gatekeeper.

Information (such as allocated bandwidth) that EP_2 would be aware of had it sent its own ARQ to GK and received an ACF.

Upon receipt of the Set-up message 520 and upon processing the token, the Connect/Facility messages 530 are sent by EP_2 516 and EP_1 514.

Figure 6:
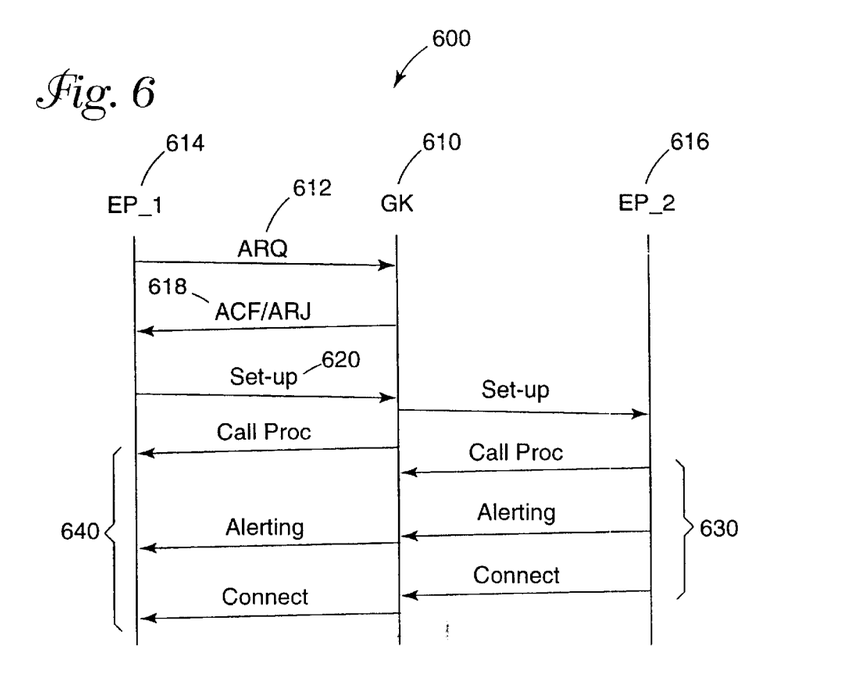
FIG. 6 illustrates the call setup messaging when Both endpoints are registered to the same gatekeeper and gatekeeper routed call signaling is used.

FIG. 6 illustrates the call setup messaging when Both endpoints are registered to the same gatekeeper and gatekeeper routed call signaling is used 600. In FIG. 6, when GK 610 gets an ARQ 612 from EP_1 614 indicating its desire to communicate with EP_2 616, a decision of ACF/ARJ 618 is made with both EP_1 614 and EP_2 616 in mind. An ARJ is sent if some required criterion, such as bandwidth requirements or authorization, is not satisfied. If the requirements are satisfied, GK 610 sends an ACF to EP_1 614 along with a token (or cryptotoken). This token is then passed by EP_1 614 to GK 610 in the Set-up message 620 that is then sent by GK 610 to EP_2 616. The information carried in the token includes:

Assurance that the token was generated by EP_2's gatekeeper.

Information (such as allocated bandwidth) that EP_2 would be aware of had it sent its own ARQ to GK and received an ACF.

Upon receipt of the Set-up message and upon processing the token, the Connect/Facility messages 630 are sent by EP_2 616 to GK 610 which sends a Connect/Facility 640 to EP_1 614.

Figure 7:
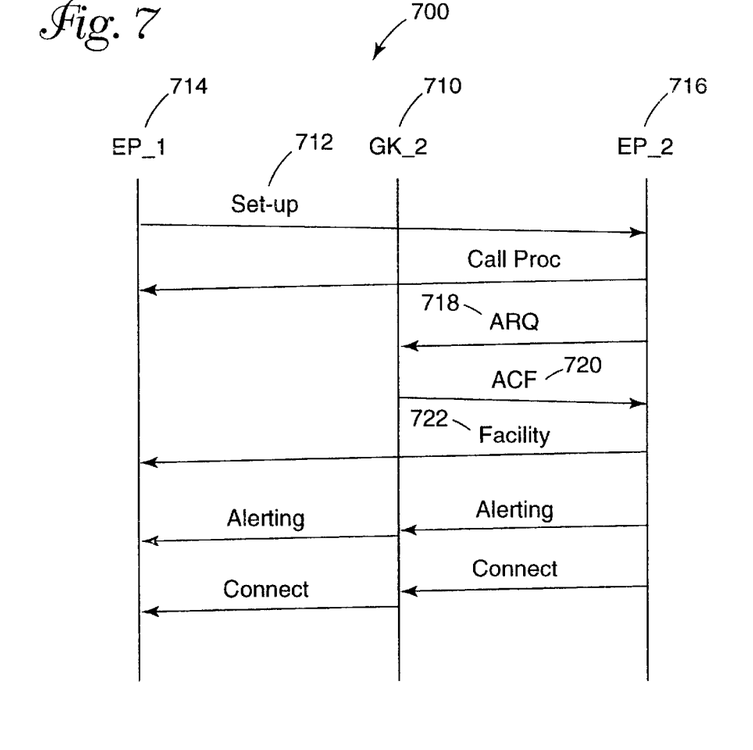
FIG. 7 illustrates the call signaling when only the called endpoint registered and gatekeeper routed call signaling is used.

FIG. 7 illustrates the call signaling when only the called endpoint registered and gatekeeper routed call signaling is used 700. Upon receipt of the Set-up message 712 from EP_1 714, EP_2 716 sends an ARQ 718 to GK_2 710. All the information that is necessary for call set-up by GK_2 710, had it received a Set-up message 712 directly from EP_1 714, is included in the ARQ message 718. GK_2 710 then processes the set-up information that was included in the ARQ message 718. GK_2 710 then sends an ACF 720 (instead of an ARJ) to EP_2 716 if other criteria such as bandwidth requirements and authorization are satisfied. In the ACF messaging 720, GK_2 710 indicates to EP_2 716 that it wishes to route the call signaling channel and provides its call signaling channel transport address. EP_2 716 sends a Facility message 722 to EP_1 714 indicating that the cell signaling channel needs to be routed through GK_2 710 and also includes GK_2's 710 call signaling channel transport address. EP_1 714, however, does not have to release the original set-up and send a new set-up to GK_2 710.

When only the calling endpoint registered and direct call signaling is used, the message exchange is identical to the message exchange disclosed in the H.323 specification. When only the called endpoint is registered and direct call signaling is used, the message exchange is identical to H.323 specification. However, some additional information needs to be included in the ARQ message sent by EP_2 to GK_2. All the information that is necessary for call set-up by GK_2, had it received a Set-up message directly from EP_1, is included. Since GK_2 decides not to route the call signaling channel, it does not make use if this information in this case.

Figure 8:
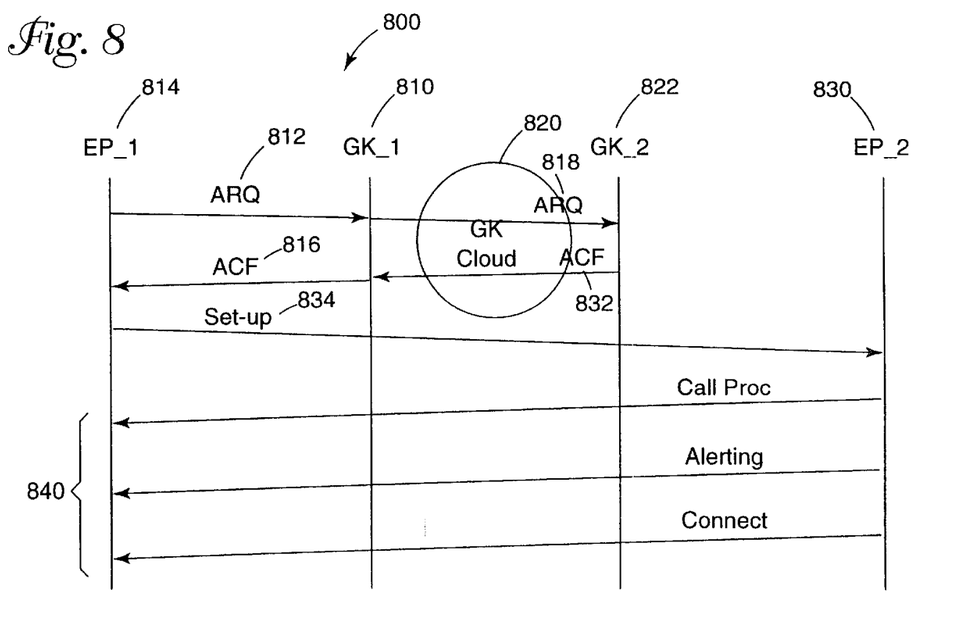
FIG. 8 illustrates the call setup messaging when both endpoints are registered and both gatekeepers use direct call signaling.

FIG. 8 illustrates the call setup messaging when both endpoints are registered and both gatekeepers use direct call signaling 800. When GK_1 810 receives an ARQ 812 from EP_1 814, it checks for certain criteria that can be locally checked such as bandwidth requirement, authorization, etc. If some requirement is not satisfied, an ARF 816 is sent to EP_1 814. If all local requirements are satisfied, the ARQ 818 traverses a cloud 820 of zero or more gatekeepers before being received by GK_2 822. Based on bandwidth requirements, authorization and other criteria, GK_2 822 decides to either send an ACF or ARJ. The call signaling channel transport address of EP_2 830 is included in the ACF 832. GK_2 822 decides to either send an ACF or ARJ. The call signaling channel transport address of EP_2 830 is included in the ACF 832. GK_2 822 also includes a token/cryptotoken containing information as described earlier. The ACF/ARJ message 832 goes through the gatekeeper cloud 820 before arriving at GK_1 810. If an ARJ arrives, G_1 810 sends an ARJ to EP_1 814. Else, GK_1 810 sends an ACF 816 to EP_1 814 with the call signaling channel transport address of EP_2 830. The Set-up 834 and Connect messages 840 are between EP_1 814 and EP_2 830. The Set-up 834 includes the token that GK_2 822 had sent in the ACF message 832.

Figure 9:
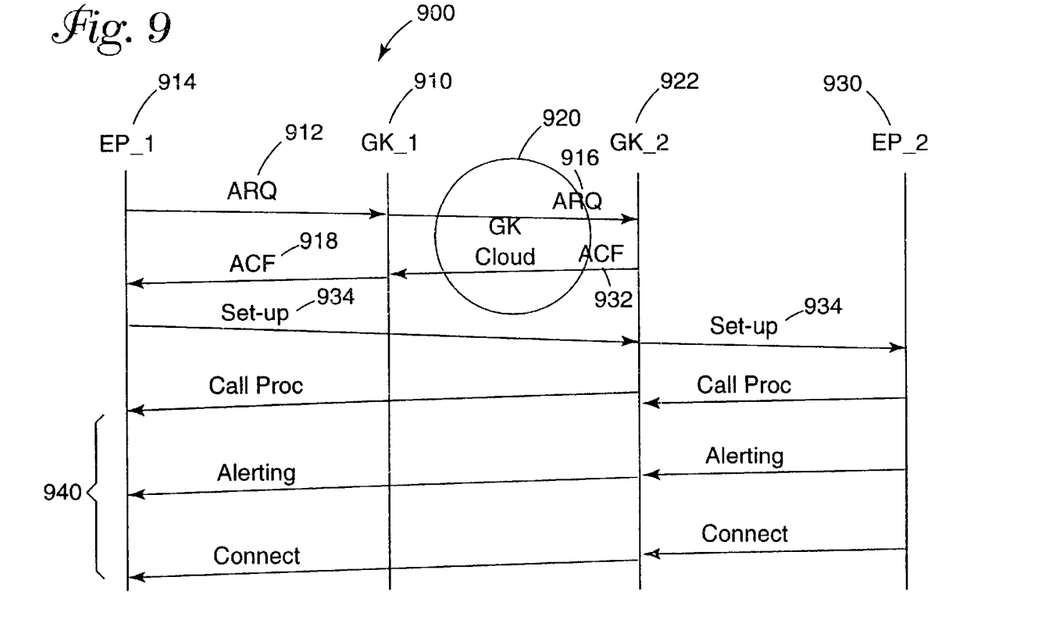
FIG. 9 illustrates the call setup messaging when both endpoints are registered and direct/routed call signaling is used.

FIG. 9 illustrates the call setup messaging when both endpoints are registered and direct/routed call signaling is used 900. When GK_1 910 receives an ARQ 912 from EP_1 914, GK_1 910 checks for certain criteria that can be locally checked such as bandwidth requirement, authorization etc. If some requirement is not satisfied, an ARJ is sent to EP_1 914. If all local requirements are satisfied, the ARQ 916 traverses a cloud 920 of zero or more gatekeepers before being received by GK_2 922. Based on bandwidth requirements, authorization and other criteria, GK_2 922 decides to either send an ACF or ARJ. The call signaling channel transport address of GK_2 922 is included in the ACF 932. GK_2 922 also includes a token/cryptotoken containing information as described earlier. The ACF/ARJ messages 932 goes through the gatekeeper cloud 920 before arriving at GK_1 910. If an ARJ arrives, GK_1 910 sends an ARJ to EP_1 914. Else, GK_1 910 sends an ACF 916 to EP_1 914 with the call signaling channel transport address of GK_2 922. The Set-up message 934 is sent by EP_1 914 to GK_2 922 which routes it to EP_2 930. The Set-up 934 includes the token that GK_2 922 had sent in the ACF message 932. The Connect messages 940 from EP_2 930 are sent to GK_2 922 which routes them to EP_1 914.

Figure 10:
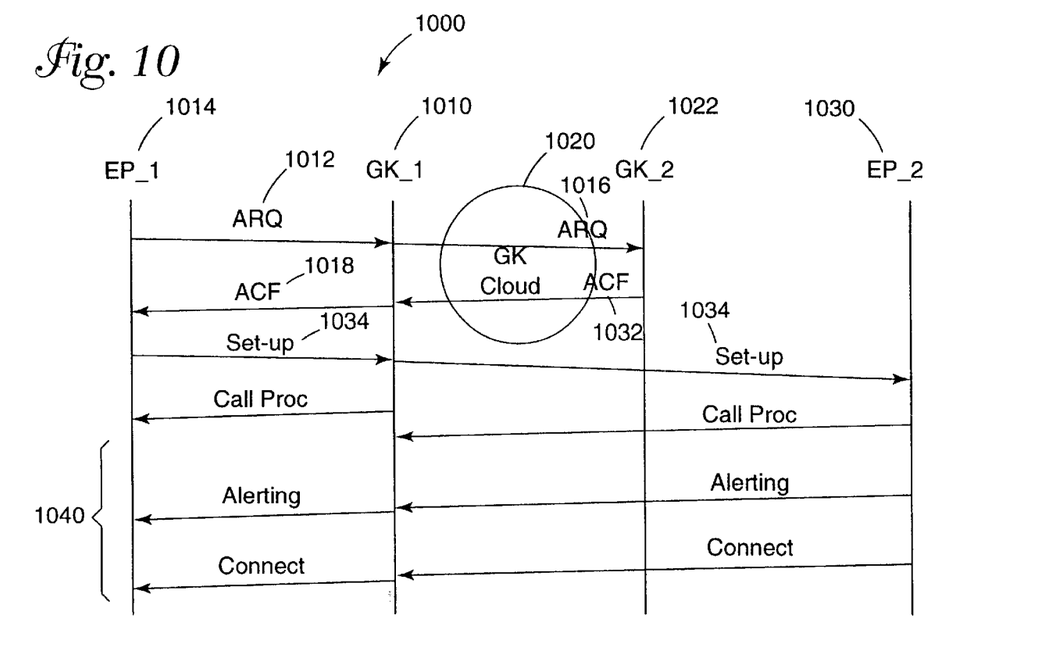
FIG. 10 illustrates the call setup messaging when both endpoints are registered and routed/direct call signaling is used.

FIG. 10 illustrates the call setup messaging when both endpoints are registered and routed/direct call signaling is used 1000. When GK_1 1010 receives an ARQ 1012 from EP_1 1014, GK_1 1010 checks for certain criteria that can be locally checked such as bandwidth requirement, authorization etc. If some requirement is not satisfied, an ARJ is sent to EP_1 1014. If all local requirements are satisfied, the ARQ 1016 traverses a cloud 1020 of zero or more gatekeepers before being received by GK_2 1022. Based on bandwidth requirements, authorization and other criteria, GK_2 1022 decides to either send an ACF or ARJ. The call signaling channel transport address of EP_2 1030 is included in the ACF 1032. GK_2 1022 also includes a token/cryptotoken containing information as described earlier. The ACF/ARJ messages 1032 goes through the gatekeeper cloud 1020 before arriving at GK_1 1010. If an ARJ arrives, GK_1 1010 sends an ARJ to EP_1 1014. Else, GK_1 1010 sends an ACF 1016 to EP_1 014 with the call signaling channel transport address of GK_2 1022. The Set-up message 1034 is sent by EP_1 1014 to GK_1 1010 which routes it to EP_2 1030. The Set-up 1034 includes the token that GK_2 1022 had sent in the ACF message 1032. The Connect messages 1040 from EP_2 1030 are sent to GK_1 1010 which routes them to EP_1 1014.

Figure 11:
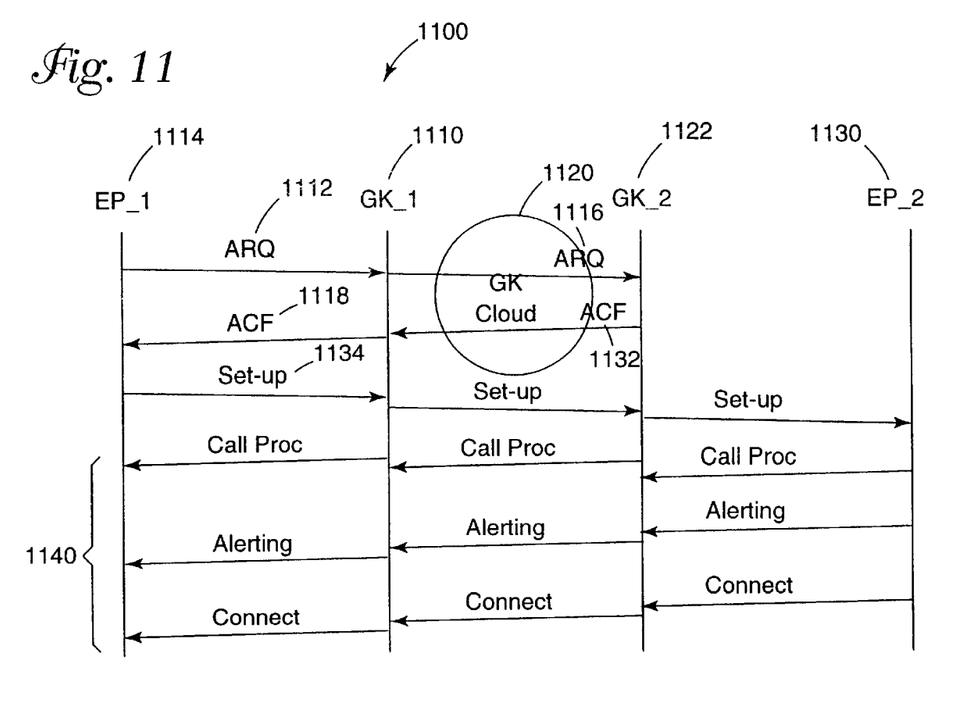
FIG. 11 illustrates the call setup messaging when both endpoints are registered and routed/routed call signaling is used.

FIG. 11 illustrates the call setup messaging when both endpoints are registered and routed/routed call signaling is used 1100. When GK_1 1110 receives an ARQ 1112 from EP_1 1114, GK_1 1110 checks for certain criteria that can be locally checked such as bandwidth requirement, authorization etc. If some requirement is not satisfied, an ARJ is sent to EP_1 1114. If all local requirements are satisfied, the ARQ 1116 traverses a cloud 1120 of zero or more gatekeepers before being received by GK_2 1122. Based on bandwidth requirements, authorization and other criteria, GK_2 1122 decides to either send an ACF or ARJ. The call signaling channel transport address of GK_2 1122 is included in the ACF 1132. GK_2 1122 also includes a token/cryptotoken containing information as described earlier. The ACF/ARJ messages 1132 goes through the gatekeeper cloud 1120 before arriving at GK_1 1110. If an ARJ arrives, GK_1 1110 sends an ARJ to EP_1 1114. Else, GK_1 1110 sends an ACF 1116 to EP_1 1114 with the call signaling channel transport address of itself. The Set-up message 1134 is sent by EP_1 1114 to GK_1110 which routes it to GK_2 1122. The Set-up 1134 includes the token that GK_2 1122 had sent in the ACF message 1132. The Connect messages 1140 from EP_2 1130 are sent to GK_2 1122 which routes them to GK_1 1110 which in turn routes them to EP_1 1114.

In summary, the present invention provides a method for performing call setup in H.323 systems that uses fewer message exchanges, thereby resulting in a more efficient call setup mechanism. Moreover, no call setup functionality is sacrificed by resorting to fewer message exchanges. In comparison, the currently existing fast start mechanism in the H.323 standard, while resulting in fewer message exchanges, compromises the call setup functionality.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for improving call setup efficiency in multimedia communication systems, comprising:
    placing a call at a first endpoint to a remote endpoint;
    requesting admission from a gatekeeper for the call;
    returning an accept message to the first endpoint, the accept message including a token for providing information to the remote endpoint alleviating the need of the remote endpoint to request admission from a gatekeeper;
    routing a setup message to the remote endpoint, the setup message including the token; and
    completing a call setup based upon information in the token.

2. The method of claim 1 wherein the first endpoint and the remote endpoint are registered with a common gatekeeper.

3. The method of claim 2 wherein direct call signaling is implemented by the first endpoint and the remote endpoint, the routing of the setup message being performed by transmitting directly to the remote endpoint the setup message including the token.

4. The method of claim 2 wherein gatekeeper routed call signaling is implemented, the routing of the setup message is performed by routing the setup message including the token from the first endpoint to the common gatekeeper and routing the setup message including the token from the common gatekeeper to the remote endpoint.

5. The method of claim 1 wherein the first endpoint is registered with a first gatekeeper and the remote endpoint is registered with a second gatekeeper.

6. The method of claim 5 wherein the requesting admission from a gatekeeper for the call further comprises:
    requesting admission by the first endpoint from the first gatekeeper;
    analyzing by the first gatekeeper the admission request to determine if a criterion for the call is acceptable according to requirements local to the first gatekeeper;
    routing the admission request to the second gatekeeper when the first gatekeeper determines the criterion for the call is acceptable;
    analyzing by the second gatekeeper the admission request to determine if a criterion for the call is acceptable according to requirements local to the second gatekeeper; and
    sending an admission confirmation including the token to the first gatekeeper when a required criterion for the call is determined to be acceptable according to the requirements local to the second gatekeeper.

7. The method of claim 6 wherein the first and second gatekeepers implement direct call signaling, the routing of the setup message being performed by transmitting directly to the remote endpoint the setup message including the token.

8. The method of claim 6 wherein the first gatekeeper implements direct call signaling and the second gatekeeper implements routed call signaling, the routing of the setup message is performed by transmitting the setup message including the token to the second gatekeeper and the second gatekeeper transmitting the setup message including the token to the remote endpoint.

9. The method of claim 8 wherein the completing the call setup further comprises routing of the setup message by transmitting connect/facility messages from the remote endpoint to the second gatekeeper and transmitting the connect/facility messages to the first endpoint setup message from the second gatekeeper.

10. The method of claim 6 wherein the first gatekeeper implements routed call signaling and the second gatekeeper implements direct call signaling, the routing of the setup message is performed by transmitting the setup message including the token to the first gatekeeper and the first gatekeeper transmitting the setup message including the token to the remote endpoint.

11. The method of claim 10 wherein the completing the call setup further comprises routing of the setup message by transmitting connect/facility messages from the remote endpoint to the first gatekeeper and transmitting the connect/facility messages to the first endpoint setup message from the first gatekeeper.

12. The method of claim 6 wherein the first gatekeeper and the second gatekeeper implement routed call signaling, and wherein the routing of the setup message comprises transmitting the setup message including the token to the first gatekeeper, transmitting the setup message including the token from the first gatekeeper to the second gatekeeper, and transmitting the setup message including the token from the second gatekeeper to the remote endpoint.

13. The method of claim 12 wherein the completing the call setup further comprises routing of the setup message by transmitting connect/facility messages from the remote endpoint to the second gatekeeper, transmitting the connect/facility messages to the first gatekeeper from the second gatekeeper, and transmitting the connect/facility messages to the first endpoint setup message from the first gatekeeper.

14. The method of claim 6 wherein the routing the admission request to the second gatekeeper further comprises routing the admission request through a cloud of gatekeepers.

15. The method of claim 5 wherein the token comprises a transport address of the second gatekeeper.

16. The method of claim 1 wherein the token comprises resource allocations for the call.

17. An multimedia communications system, comprising:

a first endpoint for placing a call to a remote endpoint;

a gatekeeper, operatively coupled to the first endpoint, the gatekeeper performing address translation, admission control and bandwidth control;

wherein the first endpoint requests admission from the gatekeeper for the call, the gatekeeper returns an accept message to the first endpoint, the accept message including a token for providing information to the remote endpoint alleviating the need of the remote endpoint to request admission from a gatekeeper, the first endpoint routes a setup message to the remote endpoint, the setup message including the token and the remote endpoint completes the call setup based upon information in the token.

18. The multimedia communications system of claim 17 wherein the first endpoint and the remote endpoint are registered with a common gatekeeper.

19. The multimedia communications system of claim 18 wherein direct call signaling is implemented by the first endpoint and the remote endpoint, the first endpoint routing the setup message by transmitting directly to the remote endpoint the setup message including the token.

20. The multimedia communications system of claim 18 wherein gatekeeper routed call signaling is implemented, the first endpoint routing the setup message by routing the setup message including the token to the common gatekeeper, the common gatekeeper routing the setup message including the token to the remote endpoint.

21. The multimedia communications system of claim 17 wherein the first endpoint is registered with a first gatekeeper and the remote endpoint is registered with a second gatekeeper.

22. The multimedia communications system of claim 21 wherein first endpoint requests admission from the first gatekeeper, the first gatekeeper analyzing the admission request to determine if a criterion for the call is acceptable according to requirements local to the first gatekeeper, the first gatekeeper routing the admission request to the second gatekeeper when the first gatekeeper determines the criterion for the call is acceptable; the second gatekeeper analyzing the admission request to determine if a criterion for the call is acceptable according to requirements local to the second gatekeeper; and the second gatekeeper sending an admission confirmation including the token to the first gatekeeper when a required criterion for the call is determined to be acceptable according to the requirements local to the second gatekeeper.

23. The multimedia communications system of claim 22 wherein the first and second gatekeepers implement direct call signaling, the first endpoint routing the setup message by transmitting directly to the remote endpoint the setup message including the token.

24. The multimedia communications system of claim 22 wherein the first gatekeeper implements direct call signaling and the second gatekeeper implements routed call signaling, the first endpoint routing the setup message by transmitting the setup message including the token to the second gatekeeper, the second gatekeeper transmitting the setup message including the token to the remote endpoint.

25. The multimedia communications system of claim 24 wherein the remote endpoint completes the call setup by transmitting connect/facility messages to the second gatekeeper, the second gatekeeper transmitting the connect/facility messages to the first endpoint setup message.

26. The multimedia communications system of claim 22 wherein the first gatekeeper implements routed call signaling and the second gatekeeper implements direct call signaling, the first endpoint routing the setup message transmitting the setup message including the token to the first gatekeeper, the first gatekeeper transmitting the setup message including the token to the remote endpoint.

27. The multimedia communications system of claim 26 wherein the remote endpoint completes the call setup by transmitting connect/facility messages to the first gatekeeper, the first gatekeeper transmitting the connect/facility messages to the first endpoint setup message from the first gatekeeper.

28. The multimedia communications system of claim 22 wherein the first gatekeeper and the second gatekeeper implement routed call signaling, and wherein the routing of the setup message by the first endpoint to the remote endpoint comprises transmitting the setup message including the token to the first gatekeeper, transmitting the setup message including the token from the first gatekeeper to the second gatekeeper, and transmitting the setup message including the token from the second gatekeeper to the remote endpoint.

29. The multimedia communications system of claim 28 wherein the remote endpoint completes the call setup by transmitting connect/facility messages to the second gatekeeper, the second gatekeeper transmitting the connect/facility messages to the first gatekeeper, and the first gatekeeper transmitting the connect/facility messages to the first endpoint setup message from the first gatekeeper.

30. The multimedia communications system of claim 22 further comprising a cloud of gatekeepers coupling the first and second gatekeepers, wherein the first gatekeeper routes the admission request to the second gatekeeper through the cloud of gatekeepers.

31. The multimedia communications system of claim 21 wherein the token comprises a transport address of the second gatekeeper.

32. The multimedia communications system of claim 17 wherein the token comprises resource allocations for the call.

* * * * *